(12) United States Patent
Ebsen et al.

(10) Patent No.: US 12,541,321 B2
(45) Date of Patent: Feb. 3, 2026

(54) WRITE AMPLIFICATION PENALTY REPORTING

(71) Applicant: Micron Technology, Inc., Boise, ID (US)

(72) Inventors: David Ebsen, Minnetonka, MN (US); Daniel J. Hubbard, Boise, ID (US); Kevin R Brandt, Boise, ID (US); Sampath Ratnam, San Jose, CA (US); Brent Carl Byron, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/776,991

(22) Filed: Jul. 18, 2024

(65) Prior Publication Data

US 2025/0028479 A1 Jan. 23, 2025

Related U.S. Application Data

(60) Provisional application No. 63/527,939, filed on Jul. 20, 2023.

(51) Int. Cl.
*G06F 3/06* (2006.01)
(52) U.S. Cl.
CPC .......... *G06F 3/0655* (2013.01); *G06F 3/0604* (2013.01); *G06F 3/0664* (2013.01); *G06F 3/0679* (2013.01)
(58) Field of Classification Search
CPC .... G06F 3/0655; G06F 3/0604; G06F 3/0664; G06F 3/0679; G06F 3/0616; G06F 3/0652
See application file for complete search history.

(56) References Cited

U.S. PATENT DOCUMENTS

| 11,146,289 | B2 | 10/2021 | Bhatia et al. | |
| 2016/0188219 | A1* | 6/2016 | Peterson | G06F 12/0246 711/103 |
| 2019/0384704 | A1 | 12/2019 | Gorobets et al. | |
| 2021/0133099 | A1 | 5/2021 | Muchherla et al. | |
| 2022/0350489 | A1* | 11/2022 | Kanno | G06F 3/0644 |

OTHER PUBLICATIONS

"International Application Serial No. PCT US2024 038565, International Search Report mailed Oct. 30, 2024", 3 pages.
"International Application Serial No. PCT US2024 038565, Written Opinion mailed Oct. 30, 2024", 4 pages.

* cited by examiner

*Primary Examiner* — Francisco A Grullon
(74) *Attorney, Agent, or Firm* — Schwegman Lundberg & Woessner, P.A.

(57) ABSTRACT

Aspects of the present disclosure configure a memory subsystem controller to inform a host about write amplification penalty for host invalidations. The controller generates a virtual memory group comprising a portion of a memory component of a set of memory components. The controller computes a write amplification penalty associated with invalidating data associated with the virtual memory group. The controller communicates, to a host, information about the write amplification penalty associated with invalidating data associated with the virtual memory group. The controller receives, from the host, a request to invalidate data associated with the virtual memory group, the request being generated by the host based on the write amplification penalty.

20 Claims, 7 Drawing Sheets

| VIRTUAL MEMORY GROUP | WRITE AMPLIFICATION PENALTY | PHYSICAL MEMORY COMPONENT |
|---|---|---|
| VG1 | 1.5 | RU1 – LBA0-100 |
| VG2 | 1.5 | RU1 – LBA100-150 + RU2 – LBA0-50 |
| VG3 | 1.5 | RU2 – LBA50-150 |
| VG4 | 1.3 | BLOCK_1+BLOCK_2+BLOCK_3 |
| VG5 | 1.3 | BLOCK_3+BLOCK_4+BLOCK_5 |

*FIG. 4*

WRITE AMPLIFICATION PENALTY REPORTING

PRIORITY APPLICATION

This application claims the benefit of priority to U.S. Provisional Application Ser. No. 63/527,939, filed Jul. 20, 2023, which is incorporated herein by reference in its entirety.

TECHNICAL FIELD

Examples of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components. Some memory sub-systems arrange their memory components into reclaim groups (RGs), each of which includes sets of reclaim units (RUs). Such memory sub-systems enable a host to control the physical location (e.g., by RG and/or RU via an RU handle) into which data is programmed.

BRIEF DESCRIPTION OF THE DRAWINGS

The present disclosure will be understood more fully from the detailed description given below and from the accompanying drawings of various embodiments of the disclosure.

FIG. 4 is a block diagram of an example table of virtual memory groups, in accordance with some implementations of the present disclosure.

DETAILED DESCRIPTION

Figure 1:
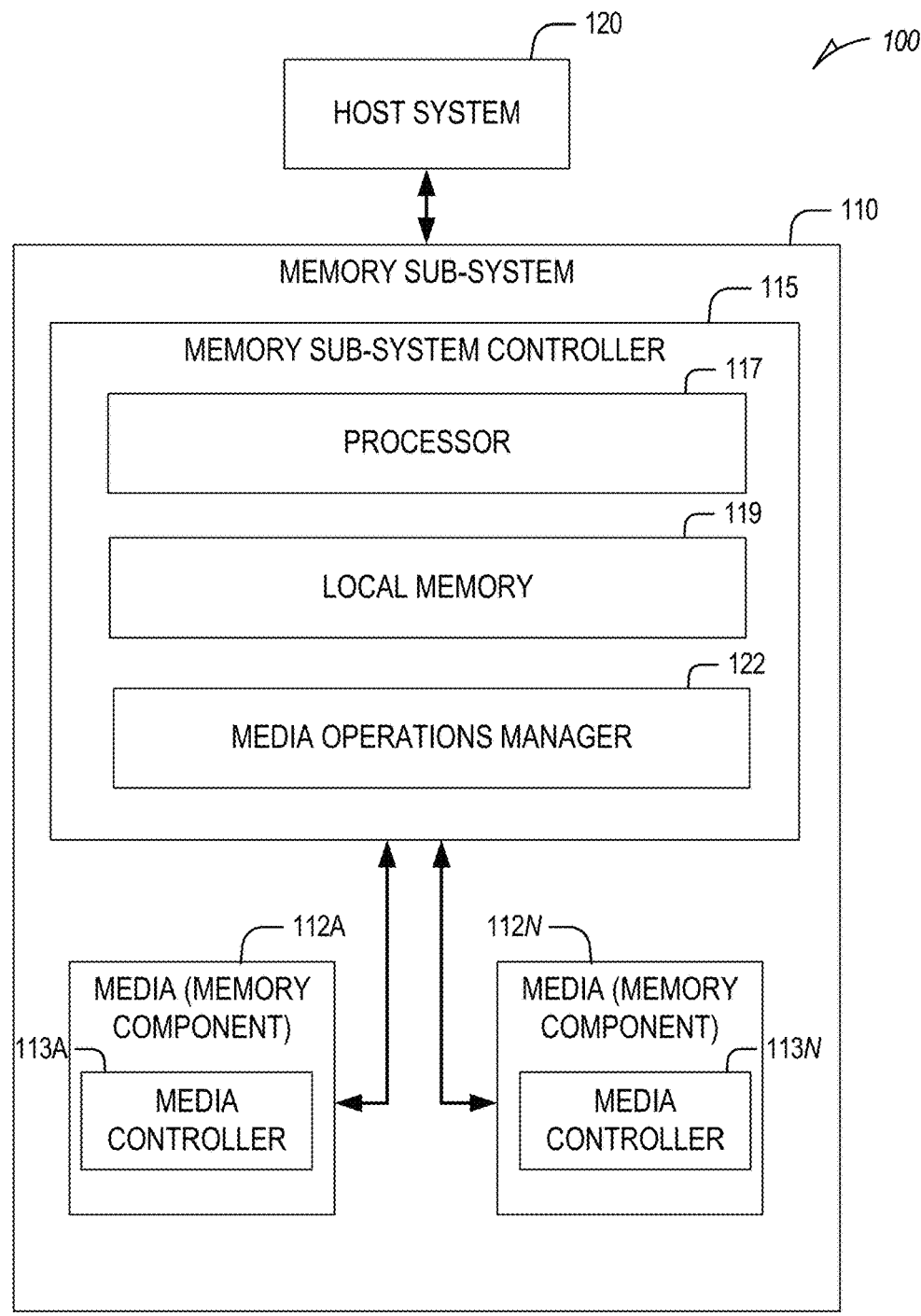
FIG. 1 is a block diagram illustrating an example computing environment including a memory sub-system, in accordance with some examples of the present disclosure.

Aspects of the present disclosure configure a system component, such as a memory sub-system controller, to allow a host to control/select the invalidation of data from virtual memory groups based on a write amplification penalty associated with such virtual memory groups. Each of the virtual memory groups can be implemented by and be used to store data on multiple physical memory components (e.g., RUs and/or RGs) and/or portions (e.g., less than all) of a corresponding physical memory component. The memory sub-system controller can provide to a host a list of different virtual memory groups along with their respective write amplification penalties. The write amplification penalty for an individual virtual memory group can represent how much valid data, such as of a different virtual memory group, will be re-written in response to invalidating data for an individual virtual memory group. Based on the write amplification penalty for the individual virtual memory group, the host can selectively determine whether or not to proceed to invalidate data for the individual virtual memory group. In this way, the host can avoid incurring unnecessary write penalties by selecting to invalidate a different virtual memory group or delaying when the individual virtual memory group is invalidated. This improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data". In some cases, the memory sub-system includes an optional feature, such as a Flexible Data Placement (FDP) feature that defines RGs and RUs. This protocol enables remote hosts to control data storage on the memory sub-systems. Some memory sub-systems define or generate virtual memory groups, such as virtual RUs. These virtual memory groups can be implemented by multiple different physical memory components and/or portions of physical memory components. By defining virtual memory groups, the data block size available to a host to store data can be kept constant across different technologies of memory sub-systems and as different portions of various blocks reach their end of life, such as when they reach their maximum PECs.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc. The re-writing of data can be referred to as a write amplification penalty. Namely, the write amplification (WA) penalty represents how many blocks of data need to be re-written when a given memory component or virtual memory component is invalidated, such as by a host. In some cases, a WA penalty of '1' means that each NAND block contains data that is no longer valid such that garbage collection does not have to move any valid data from a block before it is erased and re-used.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Certain memory systems group the physical memory components into different RGs where each RG includes multiple RUs. The RUs can be of any size that is at least as large as the LUN. Namely, the RU can be the size of a single block or can be the size of a superblock spanning multiple memory dies. These memory systems allow hosts to store data to certain RG and/or to certain RUs within those RGs using corresponding RU handles (write pointers). This provides greater control to the host as to where data is physically stored. Once data is stored to an individual RG, garbage collection operations can be performed but are limited to folding data using the RUs of the individual RG. Namely, data cannot be folded into any RU or another RG but all remains stored in the same RG.

While allowing host devices to control where data is physically stored provides additional flexibility, such processes also introduce inefficiencies in data storage. For example, the need to perform garbage collection operations within the same RG can increase the write amplitude of the memory sub-system. Also, in some cases, data which is stale and no longer needed can be folded in the RG which unnecessarily increases the write amplitude and wastes resources. In addition, in certain memory sub-systems the association of a single physical memory component with multiple virtual memory groups can cause a significant increase in the WA penalty when a host invalidates data of only one of the multiple virtual memory groups. The need to construct or generate multiple virtual memory groups with a single physical memory component arises because NAND block sizes and the grouping of the NAND blocks to form a "super block" also known as (AKA) "garbage collection unit" AKA "RAIN parity group" AKA "Reclaim Unit (RU)", changes with each NAND generation, each SSD capacity, and each NAND vendor. In such cases, the memory controller can maintain a constant RU size reported to the host using virtual RU (VRU) but the actual physical RU (PRU) in the memory sub-system will be larger. In a sense, the virtualizing of the RU is performed so that the size can remain more consistent from generation to generation and product to product. The increase in WA penalty for invalidating data for an individual VRU reduces the efficiencies of the memory sub-systems which can take away from the benefit of constructing such virtual memory groups.

Aspects of the present disclosure address the above and other deficiencies by providing a memory controller that can coordinate with a host as to which memory components are associated with a given virtual memory group and to inform a host about the WA penalty of the given virtual memory group. This allows the host to leverage such information to selectively control and decide whether or not to invalidate data stored to the given virtual memory group. In this way, data can be stored on the memory sub-system in an efficient manner, such as by avoiding incurring a WA penalty (e.g., avoiding performing re-writing of valid data) when the host decides it is not necessary at a given time and chooses a different virtual memory group to invalidate instead. This increases the overall efficiency of operating the memory sub-system.

In some examples, the memory controller generates a virtual memory group including a portion of a memory component of the set of memory components. The memory controller computes a write amplification penalty associated with invalidating data associated with the virtual memory group. The memory controller communicates, to a host, information about the write amplification penalty associated with invalidating data associated with the virtual memory group. The memory controller receives, from the host, a request to invalidate data associated with the virtual memory group. The request can be generated by the host based on the write amplification penalty.

In some examples, the memory sub-system includes Flexible Data Placement (FDP). In some examples, the memory controller groups the set of memory components into a plurality of reclaim groups (RGs), each RG of the plurality of RGs comprising a subset of reclaim units (RUs).

In some examples, the virtual memory group is a first virtual memory group, the portion of the memory component is a first portion of the memory component, and the memory controller generates a second virtual memory group including a second portion of the memory component and a third portion of another memory component of the set of memory components. In some cases, the memory controller computes the write amplification penalty based on a first size of the first portion relative to a second size of the second portion.

In some examples, the first size corresponds to an entire size of the first virtual memory group, and the second size corresponds to less than all of an entire size of the second virtual memory group. In some cases, the write amplification penalty represents a quantity of virtual memory groups associated with the memory component including one or more fractions of virtual memory groups associated with the memory component.

In some examples, the memory controller determines that an entirety of the first virtual memory group is associated with the memory component. The memory controller determines that a fraction of the second virtual memory group is associated with the memory component. The memory controller computes the write amplification penalty by adding a quantity of virtual memory groups that are entirely associated with the memory component with the fraction of the second virtual memory group.

In some examples, the memory controller receives a request from the host to program data to the virtual memory group. The memory controller, in response to receiving the request, programs data to the portion of the memory component. In some cases, the memory controller, in response to receiving the request to invalidate the data, invalidates data stored in the memory component including data associated with the virtual memory group and data associated with a different virtual memory group.

In some examples, the memory controller groups the set of memory components into a plurality of reclaim groups (RGs), each RG of the plurality of RGs including a subset of reclaim units (RUs). The memory controller generates a plurality of virtual memory groups by associating a first portion of an individual RU with a first virtual RU and a second portion of the individual RU with a second virtual RU.

In some examples, the first virtual RU includes the virtual memory group. In some examples, the information about the write amplification penalty is transmitted to the host asynchronously. In some examples, the information about the write amplification penalty is stored in a log file. In such cases, the memory controller receives a request from the host to read the log file. The information can be transmitted to the host in response to the request to read the log file. In some examples, the memory controller generates a table that maps different virtual memory groups to respective memory components of the set of memory components.

Though various examples are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, one of the memory components 112A to 112N can be associated with a first RG and another one of the memory components 112A to 112N can be associated with a second RG. In some cases, a first portion of the memory components 112A to 112N can be associated with a first RU of the first RG and a second portion of the memory components 112A to 112N can be associated with a second RU of the second RG. The memory sub-system 110 can have any number of RGs and any number of RUs within each RG and can, in some cases, can implement the FDP.

In some examples, the first memory component 112A, block, or page of the first memory component 112A, or group of memory components including the first memory component 112A can be associated with a first reliability (capability) grade, value, measure, or lifetime (maximum) PEC. The terms "reliability grade," "endurance level," "reliability value" and "reliability measure" are used interchangeably throughout and can have the same meaning. The second memory component 112N or group of memory components including the second memory component 112N can be associated with a second reliability (capability) grade, value, measure, or lifetime (maximum) PEC. In some examples, each memory component 112A to 112N can store respective configuration data that specifies the respective reliability grade and lifetime PEC and current PEC. In some examples, a memory or register can be associated with all of the memory components 112A to 112N and can store a table that maps different RUs, RGs, groups, bins or sets of the memory components 112A to 112N to respective virtual memory groups, reliability grades, lifetime PEC values, and/or current PEC values. The table can map each virtual memory group to the respective WA penalty for that virtual memory group.

In some examples, a memory or register can be associated with all of the memory components 112A to 112N and can store a table that maps portions of the memory components 112A to 112N to different groups of RGs. The table can specify which set of memory components 112A to 112N maps to or is associated with and grouped with a first RG, and within that set, which portions of the memory components 112A to 112N correspond to RUs within the first RG. The table can also store an indication and keep track of the number of PEC of the first RG. Similarly, the table can specify which other set of memory components 112A to 112N maps to or is associated with and grouped with a second RG, and within that set, which portions of the memory components 112A to 112N correspond to RUs within the second RG. In some cases, the table stores a list of LBAs associated with each RU.

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime (maximum) PEC values and/or reliability grades associated with different groups of the memory components 112N to 112N and/or different blocks within each of the memory components 112N to 112N and/or different RUs, and/or different RGs.

In some examples, commands or operations received from the host system 120 can include a write command which can specify or identify an individual RG and/or RU within the individual RG to which to program data. Based on the individual RG specified by the write command, the memory sub-system controller 115 can determine the memory components 112A to 112N associated with the individual RG and can generate a write pointer that is used to program the data to the determined memory components 112A to 112N. In some cases, the host system 120 can select an individual RU handle and can program data using the selected individual RU handle. Any data that is written by the host system 120 using the individual RU handle can be stored to a specified RU that is associated with the RU handle. Based on which RU handle is used by the host system 120 to program data, different RUs are used by the host system 120 to physically store the data. In some cases, the host system 120 can track which LBAs are associated with which RU handles and can determine based on the LBAs the RUs in which the data is stored.

In some examples, the commands or operations received from the host system 120 can include a write command, which can specify or identify an individual virtual memory group in which to program data. Based on the virtual memory group specified by the write command, the memory sub-system controller 115 can determine the memory components 112A to 112N (e.g., the RUs, LBAs, and/or RGs) associated with the virtual memory group and can program the data into the determined memory components 112A to 112N. In some cases, the host system 120 can select an individual virtual memory group to invalidate and can issue an invalidate command to the memory sub-system controller 115 identifying the individual virtual memory group. In response, the memory sub-system controller 115 can identify a list of memory components 112A to 112N (e.g., one or more RUs and/or RGs) that are used to store the data for the individual virtual memory group. The memory sub-system controller 115 can then find the valid data in the list of memory components 112A to 112N that belong to another virtual memory group. The memory sub-system controller 115 can then re-write the found valid data from the other virtual memory group to a different memory component(s) 112A to 112N.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to coordinate with host system 120 as to which memory components are associated with a given virtual memory group and to inform host system 120 about the WA penalty of the given virtual memory group. This allows the host system 120 to leverage such information to selectively control and decide whether or not to invalidate data stored to the given virtual memory group. In this way, data can be stored on the memory sub-system 110 in an efficient manner, such as by avoiding incurring a WA penalty (e.g., avoiding performing re-writing of valid data) when the host system 120 decides it is not necessary at a given time and chooses a different virtual memory group to invalidate instead. This increases the overall efficiency of operating the memory sub-system 110.

Specifically, the media operations manager 122 can generate a virtual memory group including a portion of a memory component of the set of memory components. The media operations manager 122 computes a write amplification penalty associated with invalidating data associated with the virtual memory group. The media operations manager 122 communicates, to host system 120, information about the write amplification penalty associated with invalidating data associated with the virtual memory group. The media operations manager 122 receives, from the host system 120, a request to invalidate data associated with the virtual memory group. The request can be generated by the host system 120 based on the write amplification penalty.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
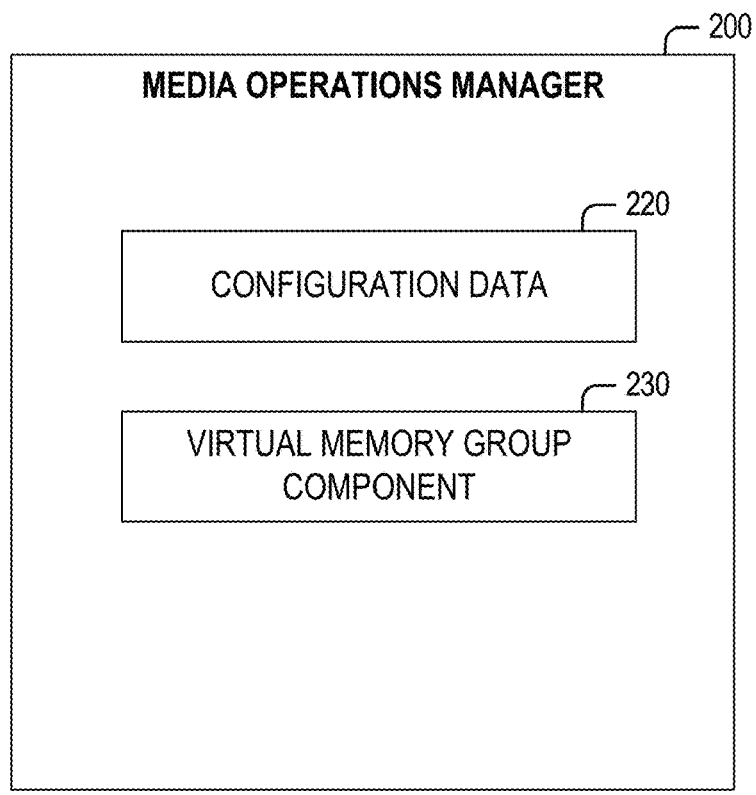
FIG. 2 is a block diagram of an example media operations manager, in accordance with some implementations of the present disclosure.

FIG. 2 is a block diagram of an example media operations manager 200 (corresponding to media operations manager 122), in accordance with some implementations of the present disclosure. As illustrated, the media operations manager 200 includes configuration data 220 and a virtual memory group component 230. For some examples, the media operations manager 200 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 200. For example, the media operations manager 200 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including virtual memory group assignments to physical memory components, lifetime (maximum) PEC values of different bins, groups, blocks, block stripes, memory dies, RUs, RGs, and/or sets of the memory components 112A to 112N, and/or group assignments that define the sizes of different RU and RGs. The media operations manager 122 can receive configuration data from the host system 120 and stores the configuration data in the configuration data 220.

The configuration data 220 can store a map that identifies which sets of memory components 112A to 112N are used to implement different RGs. The configuration data 220 can store a table that maps different virtual memory groups to different physical memory components 112A to 112N (e.g., different RUs, RGs, and/or LBAs). For example, the configuration data 220 can store a map that associates a first RG with a first portion of the memory components 112A to 112N (e.g., a first die or first set of LBAs) and that associates a second RG with a second portion of the memory components 112A to 112N (e.g., a second die or second set of LBAs). The configuration data 220 can store a table that associates a first virtual memory group with a first portion of the memory components 112A to 112N (e.g., a first die, a first portion of a first RU) and that associates a second virtual memory group with a second portion of the memory components 112A to 112N (e.g., a second die or second portion of the first RU and a first portion of a second RU). The map can store an indication of the physical addresses or LUN of the first portion of the memory components 112A to 112N associated with the first RG and/or virtual memory group and an indication of the physical addresses or LUN of the second portion of the memory components 112A to 112N associated with the second RG and/or virtual memory group. The configuration data 220 can store indications of different WA penalties associated with different virtual memory groups, RGs and/or RUs.

Figure 3:
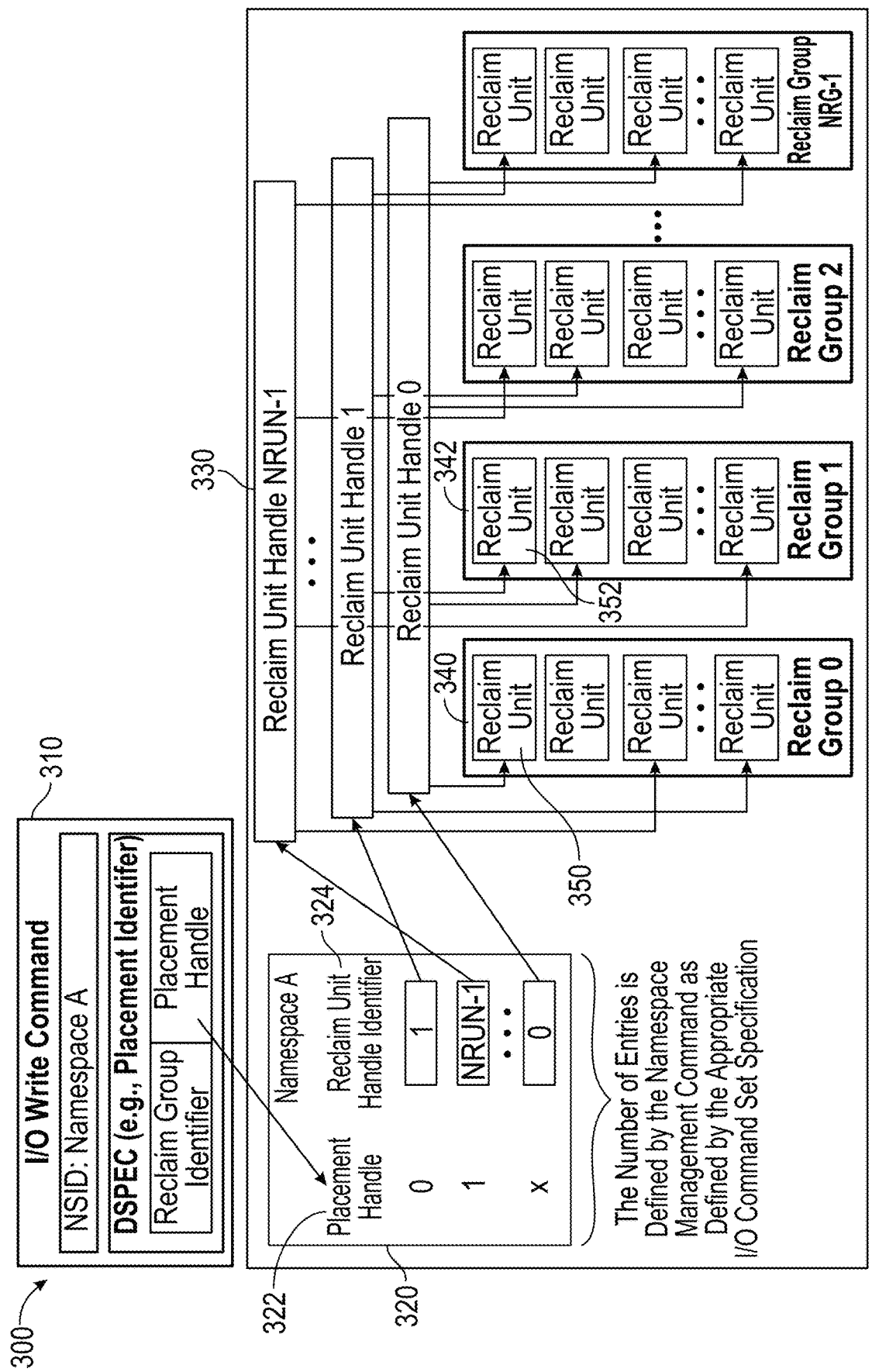
FIG. 3 is a block diagram of an example RG system implementation of the memory sub-system, in accordance with some implementations of the present disclosure.

For example, FIG. 3 is a block diagram of an example RG system 300 implementation of the memory sub-system 110. The RG system 300 includes a placement handle component 320 that is used to store the map of different groups (e.g., the map stored by the configuration data 220). The RG system 300 can receive a write command 310 that specifies at least a RG and/or a placement handle. The placement handle component 320 can search the map using the placement handle 322 to identify the RU 324 associated with the specified RG. The RG system 300 can then generate a write pointer 330 to write data to the identified RU 324.

As shown in FIG. 3, multiple RGs are defined. For example, the RG system 300 includes a first RG 340 and a second RG 342. The first RG 340 includes a first group of RUs 350. The second RG 342 includes a second group of RUs 352. In some cases, the first RG 340 can represent a single memory die and the second RG 342 represents another single memory die. Each RU in the first group of RUs 350 is implemented by a portion of the memory components 112A to 112N, such as blocks, planes, superblocks, pages, and so forth. Similarly, each RU in the second group of RUs 350 is implemented by a different portion of the memory components 112A to 112N, such as blocks, planes, superblocks, pages, and so forth. All of the garbage collection operations performed within RUs of an individual RG are constrained to that individual RG. For example, garbage collection operations performed on an individual RU of the first group of RUs 350 fold data using only the RUs in the first group of RUs 350, and garbage collection operations performed on an individual RU of the second group of RUs 352 fold data using only the RUs in the second group of RUs 352.

Referring back to FIG. 2, the virtual memory group component 230 generates a log or file that lists different WA penalties of different virtual memory groups that a host system 120 can use to control and select which data and/or virtual memory group to invalidate to reduce the overall WA and improve the efficiency of the memory sub-system 110. FIG. 4 shows an example table 400 of the different WA penalties for different virtual memory groups. For example, the table 400 includes a virtual memory group field 410 that identifies different virtual memory groups that are implemented by respective physical memory components 112A to 112N identified by the physical memory component field 460. Namely, the physical memory component field 460 can list different RUs, RGs, LBAs, blocks, pages, or other suitable memory component that implement a given virtual memory group in the virtual memory group field 410. A write amplification penalty field 440 provides the WA penalty for each virtual memory group in the virtual memory group field 410.

As an example, a first virtual memory group 446 can be associated with a first portion 462 of the memory components 112A to 112N, such as a first portion of a first RU including LBAs 100-150 and a first portion of a second RU including LBAs 0-50. A second virtual memory group can be associated with a second portion of the second RU including LBAs 50-150. In this way, the same second RU can be used to store data for two different virtual memory groups. As such, when a command from a host is received to invalidate data of the first virtual memory group 446, the memory sub-system controller 115 may need to re-write the still valid data from the second portion of the second RU corresponding to the second virtual memory group because the same second RU stores data for two different virtual memory groups. The amount of data of the second virtual memory group that is valid and stored in the same second RU that stores data for the first virtual memory group and that needs to be re-written in response to the invalidation of the data for the first virtual memory group can be determined. This amount of data can be used to compute the write amplification penalty stored in the write amplification penalty field 440 for the first virtual memory group 446 and can be communicated to the host system 120. The host system 120 can then selectively decide whether or not to incur the WA penalty associated with the first virtual memory group 446 before invaliding the data for the first virtual memory group 446.

As another example, a third virtual memory group 412 can be implemented by multiple memory blocks and/or pages in addition to or alternative to using various portions of RUs/RGs. The third virtual memory group 412 can be associated with the an individual portion 464 of the memory components 112A to 112N. These multiple memory blocks and/or pages in addition to or alternative to using various portions of RUs/RGs can be used and shared across different virtual memory groups. The amount of physical storage space on a given storage unit (e.g., memory block) that is used to implement a different virtual memory block than the virtual memory block identified by the virtual memory group field 410 can be used by the virtual memory group component 230 to compute the WA penalty for the virtual memory block identified by the virtual memory group field 410.

For example, the virtual memory group component 230 can determine that an individual physical RU has a size that can fit an entire first virtual memory group and half of a second virtual memory group. In such examples, three virtual memory groups can be implemented by two physical RUs. Namely, a first physical RU can contain the entire data of the first virtual memory group (e.g., the first VRU) and half of the data from a second virtual memory group (e.g., the second VRU). In such cases, the virtual memory group component 230 can compute the WA penalty for the first virtual memory group as a function of the amount of data that the first physical RU stores for the second virtual memory group. Namely, the virtual memory group component 230 can compute the WA penalty by summing a value '1' with half of the size of the second virtual memory group (e.g., the WA penalty is computed as 1.5).

If the host system 120 wants to invalidate the first virtual memory group, the actual WA penalty for doing this can be WA=1.5 since half of the data from the second virtual memory group will need to be relocated if the first virtual memory group were to become invalid. This may cause the host system 120 to look for a new virtual memory group candidate on the memory sub-system 110 which would have a reduced overall WA penalty.

In some examples, the host system 120 accesses the table 400 and can determine the WA penalty for an individual virtual memory group. This can be performed by looking up the WA penalty stored in the write amplification penalty field 440 for the individual virtual memory group identified in the virtual memory group field 410. Once the WA penalty is determined, the host system 120 can selectively transmit a communication to the memory sub-system 110 or the virtual memory group component 230 to invalidate the individual virtual memory group or an entirely different virtual memory group. The virtual memory group component 230 can search the table 400 to identify one or more memory components stored in the physical memory component field 460 in association with the virtual memory group that the host system 120 selects to invalidate. The virtual memory group component 230 can then determine whether any memory component (e.g., block, page, and/or RU) that is assigned to the individual memory group is shared with a different virtual memory group. The virtual memory group component 230 can reallocate any valid data that is assigned to the different virtual memory group to another memory component (e.g., the virtual memory group component 230 can rewrite the valid data to another memory component).

Figure 5:
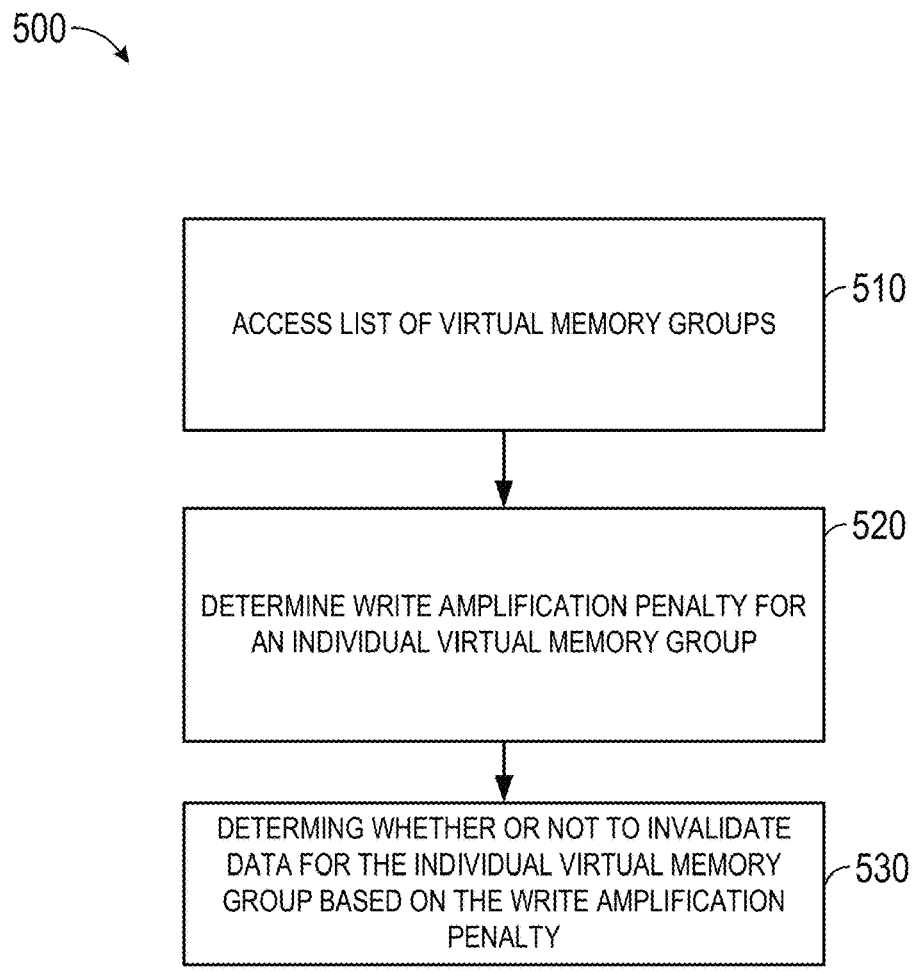
FIGS. 5 and 6 are flow diagrams of example methods to allow a host to control invalidation of data on a memory sub-system based on write amplification penalties, in accordance with some implementations of the present disclosure.

FIG. 5 is a flow diagram of an example method 500 to allow a host to control the invalidation of data on the memory sub-system based on a write amplification penalty, in accordance with some implementations of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 5, the method (or process) 500 begins at operation 510, with a host system 120 accessing a list of virtual memory groups from the memory sub-system 110. Then, at operation 520, the host system 120 determines a write amplification penalty for an individual virtual memory group of the list of virtual memory groups. At operation 530, the host system 120 determines whether or not to invalidate data for the individual virtual memory group based on the write amplification penalty.

Figure 6:
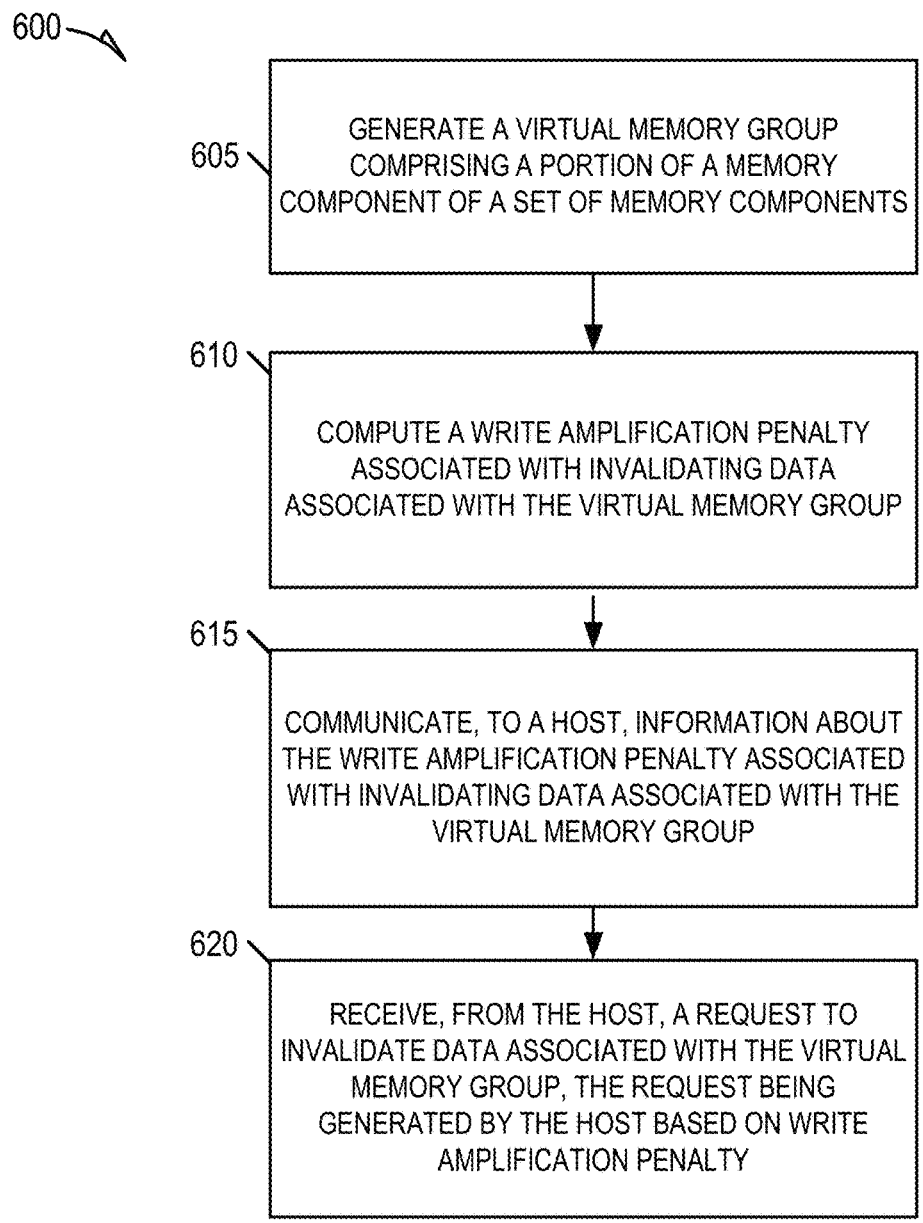

FIG. 6 is a flow diagram of an example method 600 to allow a host to control the invalidation of data on the memory sub-system, in accordance with some implementations of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 600 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 6, the method (or process) 600 begins at operation 605, with a media operations manager 122 of a memory sub-system (e.g., memory sub-system 110) generating a virtual memory group comprising a portion of a memory component of the set of memory components. Then, at operation 610, the media operations manager 122 computes a write amplification penalty associated with invalidating data associated with the virtual memory group and, at operation 615, communicates, to host system 120, information about the write amplification penalty associated with invalidating data associated with the virtual memory group, such as synchronously (e.g., via a log or other file) or asynchronously. At operation 620, the media operations manager 122 receives, from the host system 120, a request to invalidate data associated with the virtual memory group, the request being generated by the host based on the write amplification penalty.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: generating a virtual memory group comprising a portion of a memory component of the set of memory components; computing a write amplification penalty associated with invalidating data associated with the virtual memory group; communicating, to a host, information about the write amplification penalty associated with invalidating data associated with the virtual memory group; and receiving, from the host, a request to invalidate data associated with the virtual memory group, the request being generated by the host based on the write amplification penalty.

Example 2. The system of Example 1, wherein the memory sub-system includes Flexible Data Placement (FDP).

Example 3. The system of Example 2, the operations further comprising: grouping the set of memory components into a plurality of reclaim groups (RGs), each RG of the plurality of RGs comprising a subset of reclaim units (RUs).

Example 4. The system of any one of Examples 1-3, wherein the virtual memory group is a first virtual memory group, wherein the portion of the memory component is a first portion of the memory component, and the operations further comprising: generating a second virtual memory group comprising a second portion of the memory component and a third portion of another memory component of the set of memory components.

Example 5. The system of Example 4, the operations further comprising: computing the write amplification penalty based on a first size of the first portion relative to a second size of the second portion.

Example 6. The system of Example 5, wherein the first size corresponds to an entire size of the first virtual memory group, and wherein the second size corresponds to less than all of an entire size of the second virtual memory group.

Example 7. The system of Example 6, wherein the write amplification penalty represents a quantity of virtual memory groups associated with the memory component including one or more fractions of virtual memory groups associated with the memory component.

Example 8. The system of any one of Examples 5-7, the operations further comprising: determining that an entirety of the first virtual memory group is associated with the memory component; determining that a fraction of the second virtual memory group is associated with the memory component; and computing the write amplification penalty by adding a quantity of virtual memory groups that are entirely associated with the memory component with the fraction of the second virtual memory group.

Example 9. The system of any one of Examples 1-8, the operations further comprising: receiving a request from the host to program data to the virtual memory group; and in response to receiving the request, programming data to the portion of the memory component.

Example 10. The system of any one of Examples 1-9, the operations further comprising: in response to receiving the request to invalidate the data, invalidating data stored in the memory component including data associated with the virtual memory group and data associated with a different virtual memory group.

Example 11. The system of any one of Examples 1-10, the operations further comprising: grouping the set of memory components into a plurality of reclaim groups (RGs), each RG of the plurality of RGs comprising a subset of reclaim units (RUS); and generating a plurality of virtual memory groups by associating a first portion of an individual RU with a first virtual RU and a second portion of the individual RU with a second virtual RU.

Example 12. The system of Example 11, wherein the first virtual RU comprises the virtual memory group.

Example 13. The system of any one of Examples 1-12, wherein the information about the write amplification penalty is transmitted to the host asynchronously.

Example 14. The system of any one of Examples 1-13, wherein the information about the write amplification penalty is stored in a log file, the operations further comprising: receiving a request from the host to read the log file, wherein the information is transmitted to the host in response to the request to read the log file.

Example 15. The system of any one of Examples 1-14, the operations further comprising: generating a table that maps different virtual memory groups to respective memory components of the set of memory components.

Methods and computer-readable storage medium with instructions for performing any one of the above Examples.

Figure 7:
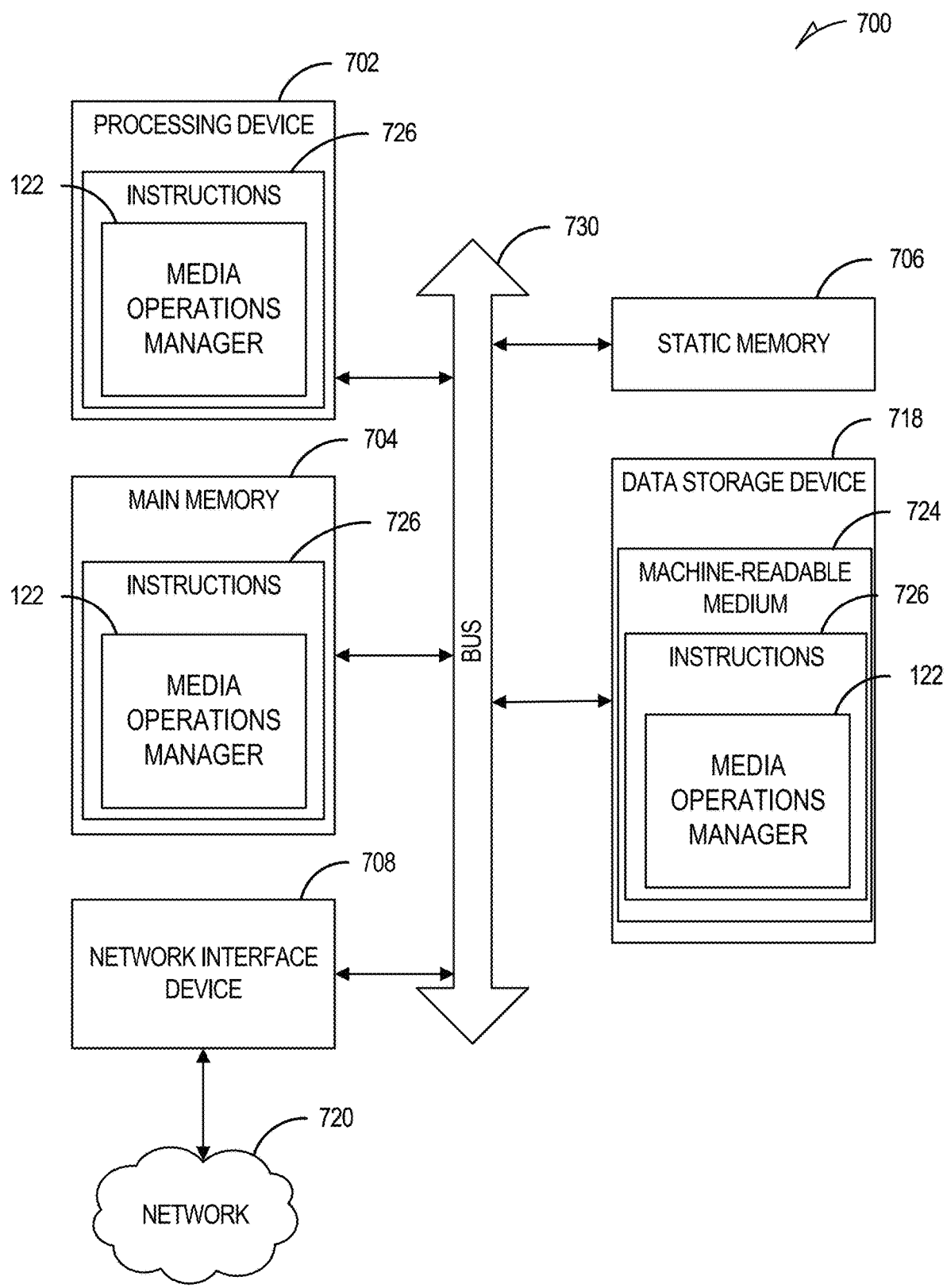
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 implement functionality corresponding to the media operations manager 122 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:
   a set of memory components of a memory sub-system; and
   at least one processing device operatively coupled to the set of memory components, the at least one processing device programmed to perform operations comprising:
      generating a first virtual memory group comprising a portion of a memory component of the set of memory components, the portion of the memory component comprising a set of data associated with the first virtual memory group and an additional set of data associated with a second additional virtual memory group, such that the first virtual memory group and the second virtual memory group share the portion of the memory component;
      computing a write amplification penalty associated with invalidating data associated with the first virtual memory group, the write amplification penalty of the first virtual memory group being computed as a function of the additional set of data that the portion of the memory component stores for the second virtual memory group;
      communicating, to a host, information about the write amplification penalty associated with invalidating data associated with the first virtual memory group; and
      receiving, from the host, a request to invalidate data associated with the first virtual memory group, the request being generated by the host based on the write amplification penalty.

2. The system of claim 1, wherein the memory sub-system includes Flexible Data Placement (FDP), wherein garbage collection operations performed within portions of the set of memory components that are part of an individual group are constrained to the individual group, the operations comprising:
   folding data associated with the portion of the memory component that is part of the individual group using only the portions of the memory components that are in the individual group; and
   folding other data associated with an additional portion of the set of memory components that is part of an additional group using only an additional set of portions of the set of memory components that are part of the additional group.

3. The system of claim 2, the operations further comprising:
   grouping the set of memory components into a plurality of reclaim groups (RGs), each RG of the plurality of RGs comprising a subset of reclaim units (RUs).

4. The system of claim 1, wherein the portion of the memory component is a first portion of the memory component, the operations further comprising:
   generating the second virtual memory group comprising a second portion of the memory component and a third portion of another memory component of the set of memory components.

5. The system of claim 4, the operations further comprising:
   computing the write amplification penalty based on a first size of the first portion relative to a second size of the second portion.

6. The system of claim 5, wherein the first size corresponds to an entire size of the first virtual memory group, and wherein the second size corresponds to less than all of an entire size of the second virtual memory group.

7. The system of claim 6, wherein the write amplification penalty represents a quantity of virtual memory groups associated with the memory component including one or more fractions of virtual memory groups associated with the memory component.

8. The system of claim 5, the operations further comprising:
determining that an entirety of the first virtual memory group is associated with the memory component;
determining that a fraction of the second virtual memory group is associated with the memory component; and
computing the write amplification penalty by adding a quantity of virtual memory groups that are entirely associated with the memory component with the fraction of the second virtual memory group.

9. The system of claim 1, the operations further comprising:
receiving a request from the host to program data to the first virtual memory group; and
in response to receiving the request, programming data to the portion of the memory component.

10. The system of claim 1, the operations further comprising:
in response to receiving the request to invalidate the data, invalidating data stored in the memory component including data associated with the first virtual memory group and data associated with a different virtual memory group.

11. The system of claim 1, the operations further comprising:
grouping the set of memory components into a plurality of reclaim groups (RGs), each RG of the plurality of RGs comprising a subset of reclaim units (RUs); and
generating a plurality of virtual memory groups by associating a first portion of an individual RU with a first virtual RU and a second portion of the individual RU with a second virtual RU.

12. The system of claim 11, wherein the first virtual RU comprises the first virtual memory group.

13. The system of claim 1, wherein the information about the write amplification penalty is transmitted to the host asynchronously.

14. The system of claim 1, wherein the information about the write amplification penalty is stored in a log file, the operations further comprising:
receiving a request from the host to read the log file, wherein the information is transmitted to the host in response to the request to read the log file.

15. The system of claim 1, the operations further comprising:
generating a table that maps different virtual memory groups to respective memory components of the set of memory components.

16. A method comprising:
generating a first virtual memory group comprising a portion of a memory component of a set of memory components, the portion of the memory component comprising a set of data associated with the first virtual memory group and an additional set of data associated with a second additional virtual memory group, such that the first virtual memory group and the second virtual memory group share the portion of the memory component;
computing a write amplification penalty associated with invalidating data associated with the first virtual memory group, the write amplification penalty of the first virtual memory group being computed as a function of the additional set of data that the portion of the memory component stores for the second virtual memory group;
communicating, to a host, information about the write amplification penalty associated with invalidating data associated with the first virtual memory group; and
receiving, from the host, a request to invalidate data associated with the first virtual memory group, the request being generated by the host based on the write amplification penalty.

17. A non-transitory computer-readable storage medium comprising instructions that, when executed by at least one processing device, cause the at least one processing device to perform operations comprising:
generating a first virtual memory group comprising a portion of a memory component of a set of memory components, the portion of the memory component comprising a set of data associated with the first virtual memory group and an additional set of data associated with a second additional virtual memory group, such that the first virtual memory group and the second virtual memory group share the portion of the memory component;
computing a write amplification penalty associated with invalidating data associated with the first virtual memory group, the write amplification penalty of the first virtual memory group being computed as a function of the additional set of data that the portion of the memory component stores for the second virtual memory group;
communicating, to a host, information about the write amplification penalty associated with invalidating data associated with the first virtual memory group; and
receiving, from the host, a request to invalidate data associated with the first virtual memory group, the request being generated by the host based on the write amplification penalty.

18. The non-transitory computer-readable storage medium of claim 17, wherein a memory sub-system comprising the set of memory components includes Flexible Data Placement (FDP).

19. The non-transitory computer-readable storage medium of claim 18, the operations further comprising:
grouping the set of memory components into a plurality of reclaim groups (RGs), each RG of the plurality of RGs comprising a subset of reclaim units (RUs).

20. The non-transitory computer-readable storage medium of claim 17, wherein the portion of the memory component is a first portion of the memory component, the operations further comprising:
generating a second virtual memory group comprising a second portion of the memory component and a third portion of another memory component of the set of memory components.

* * * * *